Patented July 23, 1940

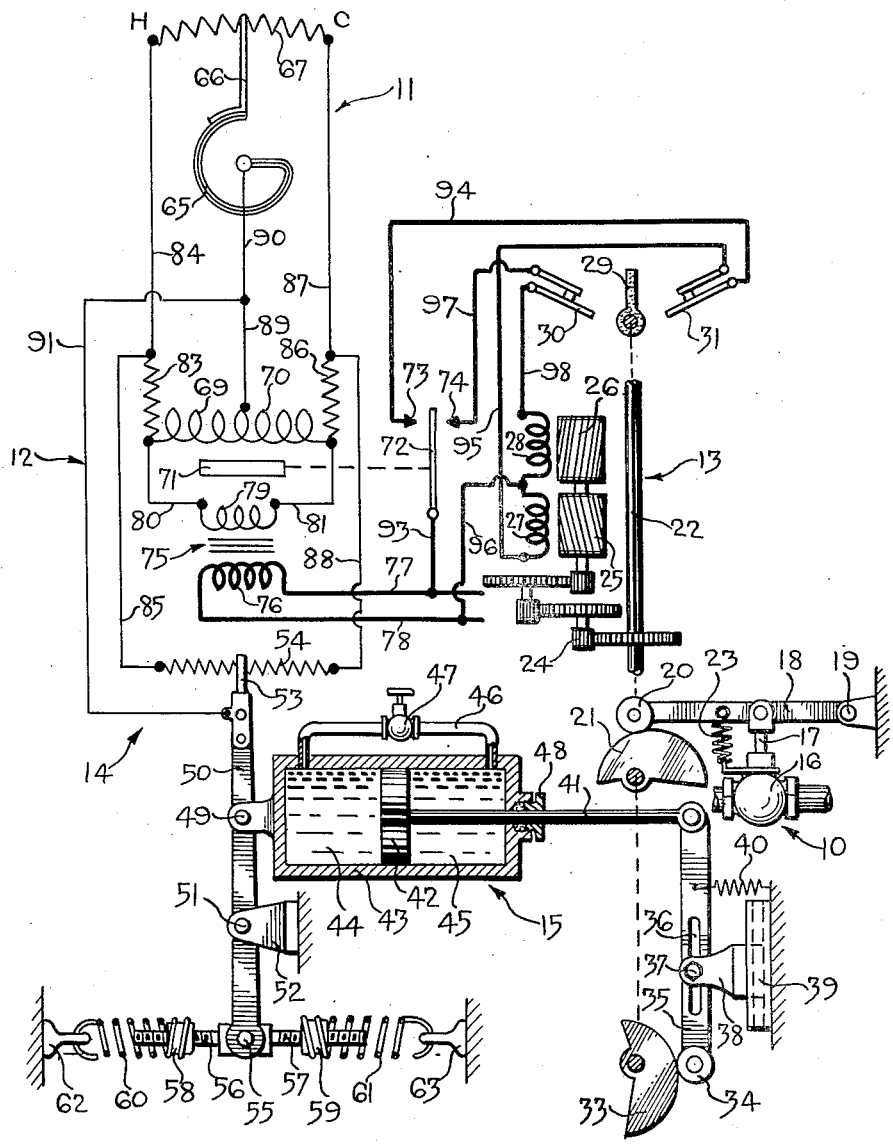

2,208,559

UNITED STATES PATENT OFFICE 2,208,559

AUTOMATIC COMPENSATED CONTROL SYSTEM

Albert E. Baak, Minneapolis, Minn., assignor to Minneapolis-Honeywell Regulator Company, Minneapolis, Minn., a corporation of Delaware Application November 23, 1936, Serial No. 112,332

12 Claims. (Cl. 236—78)

This invention relates to automatic reset or load compensation mechanisms in general and more particularly to that type of mechanism as applied to a follow-up control system.

It is an object of this invention to provide a follow-up control system for controlling the value of a condition along with a novel automatic reset or load compensated mechanism associated with the follow-up means of the follow-up system whereby the value of the condition is maintained at a substantially constant value regardless of changes in load.

It is a further object of this invention to provide an automatic reset or load compensation mechanism utilizing a spring biasing means and a hydraulic dash-pot arrangement associated therewith.

Other objects and advantages will become apparent to those skilled in the art upon reference to the accompanying specification, claims and drawing.

For a more thorough understanding of this invention, reference is made to the accompanying single sheet of drawings in which is diagrammatically disclosed the preferred form of this invention.

Referring now to the drawing, a device to be positioned in a plurality of positions for controlling the value of a condition is generally designated at 10. A control means the state of which is varied in accordance with changes in the value of the condition is generally designated at 11. The control means 11 is adapted to operate a relay generally designated at 12 and the relay 12 positions a motor 13 which, in turn, positions the device 10. The motor 13 operates a follow-up means generally designated at 14 which also influences the action of the relay 12. An automatic reset mechanism generally designated at 15 alters the operation of the follow-up means to maintain the value of the condition to be controlled at the desired normal value regardless of changes in load affecting the control system.

Although this control system may be utilized for controlling any condition, it is disclosed for purposes of illustration as controlling a temperature condition and more particularly the temperature of a space (not shown). Therefore, the device 10 is shown to be a valve 16 for controlling the supply of heating fluid to the space (not shown). The valve 16 may be operated by a valve stem 17 connected to a lever 18, one end of which is pivoted on a stationary pivot 19. The other end of the lever carries a cam follower 20 which follows the surface of a cam 21 located on a shaft 22 of the motor 13. The cam follower 20 is held in engagement with the cam 21 by a spring 23. The shaft 22 is rotated through a reduction gear train 24 by motor rotors 25 and 26. The motor rotors 25 and 26 are operated by field windings 27 and 28, the arrangement being such that when the field winding 27 is energized the valve 16 is moved towards an open position and when the field winding 28 is energized the valve 16 is moved towards a closed position.

The shaft 22 also operates an abutment member 29 preferably made of insulating material for opening limit switches 30 and 31 when the valve 16 is moved to either an extreme closed position or an extreme open position, respectively. Shaft 22 also carries a cam 33 which engages a cam follower 34 carried by a lever 35. The lever 35 is provided with a slot 36 which receives an adjustable pivot pin 37 carried by a bracket 38. The bracket 38 is slidably mounted in a stationary guide 39. The cam follower 34 is urged into engagement with the cam 33 by means of a spring 40. The other end of the lever 35 is pivotally connected to a piston rod 41. The piston rod 41 is connected to a piston 42 located in a cylinder 43. The piston 42 divides the cylinder 43 into two chambers 44 and 45 and these two chambers are connected together by a passage 46. A valve 47 controls the restriction of the passage 46. The chambers 44 and 45 and the passage 46 are completely filled with a fluid, preferably a substantially non-elastic liquid, and a packing gland designated at 48 seals the joint between the piston rod 41 and the cylinder 43. The cylinder 43 is connected by a pivot 49 to a lever 50 which is pivoted at 51 to a stationary bracket 52. The lever 50 carries a slider 53 which is adapted to slide across a potentiometer resistance element 54. The slider 53 and the resistance element 54 form a balancing potentiometer the operation of which will be pointed out more fully hereafter. Assume that the valve 47 controlling the flow of liquid through the passage 46 is closed tightly. A solid connection is thereby formed between the lever 35 and the lever 50 so that movement of the lever 35 causes like movement of the lever 50. Therefore, when the valve 16 is moved towards a closed position the slider 53 is moved towards the right, and when the valve 16 is moved towards an open position the slider 53 is moved towards the left. By sliding the bracket 38 in the guide 39, the amount of movements imparted to the slider 53 may be varied, specifically, sliding the bracket 38 upwardly decreases the amount of movement of the slider 53 and sliding the bracket 38 downwardly increases the amount of movement thereof.

Secured to the lever 50 by means of a pivot 55 is a pair of studs 56 and 57. The studs 56 and 57 carry spring anchors 58 and 59 to which are secured springs 60 and 61. The springs 60 and 61 are also connected to suitable stationary anchors 62 and 63. The springs 60 and 61 are so arranged that they always tend to bias the lever 55 in such a manner as to move the slider 53 to the mid position of the balancing potentiometer resistance element 54. By adjusting the spring anchors 58 and 59, the amount of biasing movement of the springs 60 and 61 may be adjusted.

The control means 11 the state of which is varied in accordance with changes in the value of the condition is shown to be a thermostatic control means having a thermostatic element 65 responsive to variations in space temperature. The thermostatic element 65 operates a slider 66 with respect to a potentiometer resistance element 67. The slider 66 and the resistance element 67 form a control potentiometer. Upon an increase in space temperature, the slider 66 is moved to the left with respect to the resistance element 67 in the direction indicated by the character H. Upon a decrease in space temperature, the slider 66 is moved to the right in the direction indicated by the character C. When the space temperature is at the desired normal value the slider 66 assumes a mid position as shown in the drawing, and this mid position represents the normal state of the control means.

The relay generally designated at 12 may comprise relay coils 69 and 70 for operating an armature 71. The armature 71 is suitably connected to a switch arm 72 which is adapted to engage spaced contacts 73 and 74. When the relay coil 69 is energized more than the relay coil 70 the switch arm 72 is moved into engagement with the contact 73, and when the relay coil 70 is energized more than the relay coil 69 the switch arm 72 is moved into engagement with the contact 74. When the relay coils 69 and 70 are equally energized, the switch arm 72 is maintained spaced midway between the contacts 73 and 74 as shown in the drawing. Power is supplied to the relay by means of a step-down transformer generally designated at 75. The step-down transformer 75 has a primary 76 which is connected across line wires 77 and 78 and a secondary 79. One end of the secondary 79 is connected by a wire 80 to the left end of the relay coil 69 and the other end of the secondary 79 is connected by a wire 81 to the right end of the relay coil 70. The adjacent ends of the relay coils 69 and 70 are connected together. By reason of these connections the relay coils 69 and 70 are connected in series and across the secondary 79.

The left end of the relay coil 69 is connected by a protective resistance 83 and wires 84 and 85 to the left ends of the control potentiometer resistance element 67 and the balancing potentiometer resistance element 54. In a like manner, the right end of the relay coil 70 is connected by a protective resistance 86 and wires 87 and 88 to the right ends of the control potentiometer resistance element 67 and the balancing potentiometer resistance element 54. The junction of the relay coils 69 and 70 is connected by wires 89, 90 and 91 to the slider 66 of the control potentiometer and the slider 53 of the balancing potentiometer. By reason of these wiring connections, it is seen that the control potentiometer and the balancing potentiometer are connected in parallel with the series connected relay coils 69 and 70 and across the secondary 79 of the step-down transformer 75.

It is again assumed that the valve 47 controlling the passage 46 is tightly closed and, therefore, a solid connection is provided between the lever 35 and the slider 53 of the balancing potentiometer. With the parts in the position shown in the drawing, the space temperature is at the desired normal value and, consequently, the slider 66 of the control potentiometer is in a mid position, the valve 16 is in a mid position, and the slider 53 of the balancing potentiometer is in a mid poistion. As a result of these positions, the valve 16 is supplying just the correct amount of heat to the space to make up for the heating load and the space temperature is being maintained at the desired normal value. Upon an increase in heating load, the space temperature decreases and the slider 66 moves to the right in the direction indicated by the character C. By reason of the above referred to parallel relationship, this causes a partial short circuiting of the relay coil 70 to decrease the energization thereof and increase the energization of the relay coil 69. These unequal energizations of the relay coils 69 and 70 act upon the armature 71 to move the switch arm 72 into engagement with the contact 73. This completes a circuit from the line wire 77 through wire 93, switch arm 72, contact 73, wire 94, limit switch 31, wire 95, field winding 27, and wire 96 back to the other line wire 78. Completion of this circuit energizes the field winding 27 to move the valve 16 towards an open position. Operation of the motor 13 to move the valve 16 towards an open position causes left-hand movement of the slider 53 of the balancing potentiometer. This lefthand movement causes partial short circuiting of the relay coil 69 to decrease the energization thereof and to increase the energization of the relay coil 70. When the slider 53 has moved sufficiently far to the left to rebalance the energizations of the relay coils 69 and 70, the switch arm 72 is moved out of engagement with the contact 73 to break the circuit through the field winding 27. As a result, further opening movement of the valve 16 is prevented and the valve 16 is maintained in a position in accordance with the amount of decrease in space temperature. In this manner, the valve 16 is modulated towards an open position in direct accordance with the amount of decrease in space temperature.

Upon a decrease in the heating load, the space temperature increases to move the slider 66 to the left in the direction indicated by the character H. This left-hand movement causes partial short circuiting of the relay coil 69 to decrease the energization thereof and to increase the energization of the relay coil 70. These unequal energizations of the relay coils 69 and 70 move the switch arm 72 into engagement with the contact 74 to complete a circuit from the line wire 77 through wire 93, switch arm 72, contact 74, wire 97, limit switch 30, wire 98, field winding 28, and wire 96 back to the other line wire 78. Completion of this circuit causes energization of the field winding 28 to move the valve 16 towards a closed position to decrease the supply of heat to the space. Operation of the motor 13 to move the valve 16 towards a closed position causes right-hand movement of the slider 53 of the balancing potentiometer. This right-hand movement causes partial short circuiting of the relay coil 70 to decrease the energization thereof and to increase the energization of the relay coil 69. When the slider 53 has moved sufficiently far to the right to rebalance the energizations of the relay coils 69 and 70, the switch arm 72 is moved out of engagement with the contact 74 to break the circuit through the field winding 28 to stop further closing movement of the valve 16. In this manner, the valve 16 is modulated toward a closed position in direct accordance with increases in space temperature.

By reason of the above mechanism, a follow-up control system is provided wherein the valve 16 is modulated in direct accordance with deviations in space temperature from the desired normal value. Such a system gives accurate results as long as the load on the heating system is maintained substantially constant. However, changes in load on the heating system cause what may be termed a "drooping" characteristic, that is, when the heating load is relatively great the temperature maintained in the space is lower than when the heating load is relatively light. If the control range of the control means 11 were made sufficiently narrow to overcome or minimize this "drooping" characteristic, "hunting" would likely occur. In order to prevent "hunting" and to eliminate the "drooping" characteristic, the reset mechanism generally designated at 15 is utilized.

This reset mechanism 15 comprises the hydraulic dash-pot arrangement formed by the piston 42 dividing the cylinder 43 into two chambers 44 and 45 and the passage 46, and the springs 60 and 61 which bias the slider 53 of the balancing potentiometer to a mid position.

Assume now that the valve 47 is opened a given amount so as to allow a restricted passage from one chamber 43 to the other chamber 45 and vice versa. For purposes of illustration, it is also assumed that the parts are in the position shown in the drawing. Upon an increase in heating load, the space temperature decreases to move the slider 66 towards the right which causes partial short circuiting of the relay coil 70 to decrease the energization thereof and increase the energization of the relay coil 69. This, in turn, causes operation of the field winding 27 to move the valve 16 towards an open position and by reason of the restriction afforded by the valve 47 a substantially solid connection is maintained between the lever 35 and the slider 53 of the balancing potentiometer and, therefore, the slider 53 is moved to the left to rebalance the relay 12 and therefore the valve 16 is moved towards an open position in direct accordance with the amount of decrease in space temperature. Movement of the slider 53 of the balancing potentiometer towards the left increases the tension in the spring 60 and decreases the tension in the spring 61 whereupon these springs tend to return the slider 53 of the balancing potentiometer to a mid position. This biasing action of the springs, however, is retarded by the dash-pot arrangement. As the springs move the slider 53 of the balancing potentiometer towards the right, they tend to decrease the volume of the chamber 44 and increase the volume of the chamber 45. This causes a flow of fluid from the chamber 44 through the passage 46 into chamber 45 and the rate of this flow is controlled by the valve 47. As the springs 60 and 61 move the slider 53 back toward the mid position, the relay coil 70 is partially short-circuited to decrease the energization thereof and increase the energization of the relay coil 69 to move the switch arm 72 into engagement with the contact 73. This causes energization of the field winding 27 to move the valve 16 further towards an open position and as the valve 16 is being moved further toward an open position the slider 53 is again moved towards the left and the above operation is repeated. As long as the space temperature deviates from the desired normal value, the valve 16 will be continued to be moved towards an open position and the rate of such continued movement of the valve towards the open position is controlled by the throttling valve 47. When the space temperature is restored to the desired value by this increased movement of the valve 16 towards the open position, the relay 12 becomes rebalanced and the valve 16 is maintained in its new position with respect to the position of the slider 66 of the control potentiometer. In other words, the valve 16 is reset towards an open position in direct accordance with the amount of increase in the heating load.

Assume now that the heating load decreases and as a result of this decrease the space temperature increases to move the slider 66 toward the left. This causes partial short-circuiting of the relay coil 69 to decrease the energization thereof and to increase the energization of the relay coil 70. This causes movement of the switch arm 72 into engagement with the contact 74 to energize the field winding 28 whereupon the valve 16 is moved towards a closed position. Since the passageway 46 is restricted by the throttling valve 47, the slider 53 of the balancing potentiometer is moved towards the right to rebalance the energization of the relay coils 69 and 70 whereby the valve 16 is moved towards a closed position in direct accordance with the amount of increase in space temperature. This right-hand movement of the slider 53 increases the tension in the spring 61 and decreases the tension in the spring 60 and these springs 60 and 61 tend to move the slider 53 to a mid position. This movement of the slider 53 to the mid position by the springs 60 and 61 causes transfer of fluid from the chamber 45 through the passage 46 into the chamber 44 but since this flow of fluid is restricted the movement of the slider 53 of the balancing potentiometer toward the mid position is retarded. Movement of the slider 53 of the balancing potentiometer toward the mid position causes partial short circuiting of the relay coil 69 to decrease the energization thereof and increase the energization of the relay coil 70 whereupon the valve 16 is moved further toward an open position. As the valve 16 is so further moved toward an open position, the slider 53 of the balancing potentiometer is moved toward the right to rebalance the relay and then the springs act to again move the slider 53 of the balancing potentiometer toward the mid position to again rebalance the relay 12. As long as the space temperature is above the desired normal value, the valve 16 will be positioned further towards a closed position and the rate at which this valve 16 is further positioned towards the closed position is regulated by the throttling valve 47. When the space temperature decreases to the desired normal value as a result of this further closing movement of the valve 16, the relay 12 becomes rebalanced and the valve 16 is positioned in a new position with respect to the position of the slider 66 of the control potentiometer. In other words, the valve 16 is automatically reset with respect to the value of the space temperature in accordance with the amount of decrease in the heating load.

From the above it is seen that I have provided a follow-up control system with a new and novel automatic reset mechanism whereby the valve 16 is positioned in accordance with deviations in space temperature from the desired normal value and is further positioned or reset in accordance with changes in heating load whereby the space temperature is maintained at the desired normal value regardless of changes in the heating load. Stated more broadly, I have provided a control system of the follow-up type for controlling the value of a condition wherein a reset mechanism is incorporated therein for maintaining the value of the condition substantially constant regardless of changes in load. The rate at which the condition controlling device is reset is controlled by the throttling valve 41, and if the throttling valve is properly adjusted "hunting" of the system and the "drooping" characteristic of the system will be entirely eliminated.

Although for purposes of illustration I have shown one form of my invention, other forms thereof may become apparent to those skilled in the art upon reference to this specification and, therefore, this invention is to be limited only by the scope of the appended claims and prior art.

I claim as my invention:

1. In combination, a device to be positioned in a plurality of positions for controlling the value of a condition, control means the state of which is varied in accordance with changes in the value of the condition to be controlled and having a normal state corresponding to a desired normal value of the condition to be controlled, means, including follow-up means operated by said device, controlled by said control means for positioning said device in accordance with changes in the value of the condition to be controlled, said follow-up means including a stationary member and a movable member, resilient means for biasing the movable member to a given position with respect to the stationary member, and means operated by said device for overcoming the resilient means to move the movable member with respect to the stationary member but allowing movement of the movable member to the given position by the resilient means additionally to position said device with respect to the state of the control means for returning the value of the condition to be controlled toward the desired normal value.

2. In combination, a device to be positioned in a plurality of positions for controlling the value of a condition, control means the state of which is varied in accordance with changes in the value of the condition to be controlled and having a normal state corresponding to a desired normal value of the condition to be controlled, means, including follow-up means operated by said device, controlled by said control means for positioning said device in accordance with changes in the value of the condition to be controlled, said follow-up means including a stationary member and a movable member, resilient means for biasing the movable member to a given position with respect to the stationary member, and means operated by said device for overcoming the resilient means to move the movable member with respect to the stationary member but allowing movement of the movable member to the given position by the resilient means additionally to position said device with respect to the state of the control means for returning the value of the condition to be controlled toward the desired normal value, said last mentioned means including means for regulating the rate at which the resilient means moves the movable member to the given position.

3. In combination, a device to be positioned in a plurality of positions for controlling the value of a condition, control means the state of which is varied in accordance with changes in the value of the condition to be controlled and having a normal state corresponding to a desired normal value of the condition to be controlled, means, including follow-up means operated by said device, controlled by said control means for positioning said device in accordance with changes in the value of the condition to be controlled, said follow-up means including a stationary member and a movable member, resilient means for biasing the movable member to a given position with respect to the stationary member, and means operated by said device for overcoming the resilient means to move the movable member with respect to the stationary member but allowing movement of the movable member to the given position by the resilient means additionally to position said device with respect to the state of the control means for returning the value of the condition to be controlled toward the desired normal value, said last mentioned means including an hydraulic dash-pot arrangement.

4. In combination, a device to be positioned in a plurality of positions for controlling the value of a condition, control means the state of which is varied in accordance with changes in the value of the condition to be controlled and having a normal state corresponding to a desired normal value of the condition to be controlled, means, including follow-up means operated by said device, controlled by said control means for positioning said device in accordance with changes in the value of the condition to be controlled, said follow-up means including a stationary member and a movable member, resilient means for biasing the movable member to a given position with respect to the stationary member, a connection between the movable member and the device whereby the former is moved by the latter, and means included in said connection for allowing the resilient means to return the movable member to the given position with respect to the stationary member additionally to position the device with respect to the state of the control means.

5. In combination, a device to be positioned in a plurality of positions for controlling the value of a condition, control means the state of which is varied in accordance with changes in the value of the condition to be controlled and having a normal state corresponding to a desired normal value of the condition to be controlled, means, including follow-up means operated by said device, controlled by said control means for positioning said device in accordance with changes in the value of the condition to be controlled, said follow-up means including a stationary member and a movable member, resilient means for biasing the movable member to a given position with respect to the stationary member, a connection between the movable member and the device whereby the former is moved by the latter, means included in said connection for allowing the resilient means to return the movable member to the given position with respect to the stationary member additionally to position the device with respect to the state of the control means, and means for regulating the rate at which the resilient means moves the movable member to the given position.

6. In combination, a device to be positioned in a plurality of positions for controlling the value of a condition, control means the state of which is varied in accordance with changes in the value of the condition to be controlled and having a normal state corresponding to a desired normal value of the condition to be controlled, means, including follow-up means operated by said device, controlled by said control means for positioning said device in accordance with changes in the value of the condition to be controlled, said follow-up means including a stationary member and a movable member, resilient means for biasing the movable member to a given position with respect to the stationary member, a connection between the movable member and the device whereby the former is moved by the latter, and means included in said connection for allowing the resilient means to return the movable member to the given position with respect to the stationary member additionally to position the device with respect to the state of the control means, said last mentioned means including an hydraulic dash-pot arrangement.

7. In combination, a device to be positioned in a plurality of positions for controlling the value of a condition, control impedance means adjusted in accordance with changes in the value of the condition to be controlled, relay means in control of the operation of said device, balancing impedance means adjusted by said device, connections between said control impedance means, said balancing impedance means and said relay means whereby the device is positioned in accordance with changes in the value of the condition to be controlled, said balancing impedance means including a relatively stationary member and a movable member, resilient means for biasing the movable member to a given position with respect to the stationary member, and means operated by said device for overcoming the resilient means to move the movable member with respect to the stationary member but allowing the resilient means to return the movable member to the given position additionally to position said device differently with respect to the value of the condition to be controlled.

8. In combination, a device to be positioned in a plurality of positions for controlling the value of a condition, control impedance means adjusted in accordance with changes in the value of the condition to be controlled, relay means in control of the operation of said device, balancing impedance means adjusted by said device, connections between said control impedance means, said balancing impedance means and said relay means whereby the device is positioned in accordance with changes in the value of the condition to be controlled, said balancing impedance means including a relatively stationary member and a movable member, resilient means for biasing the movable member to a given position with respect to the stationary member, means operated by said device for overcoming the resilient means to move the movable member with respect to the stationary member but allowing the resilient means to return the movable member to the given position additionally to position said device differently with respect to the value of the condition to be controlled, and means for adjusting the rate at which the movable means is returned to the given position by the resilient means.

9. In combination, a device to be positioned in a plurality of positions for controlling the value of a condition, control impedance means adjusted in accordance with changes in the value of the condition to be controlled, relay means in control of the operation of said device, balancing impedance means adjusted by said device, connections between said control impedance means, said balancing impedance means and said relay means whereby the device is positioned in accordance with changes in the value of the condition to be controlled, said balancing impedance means including a relatively stationary member and a movable member, resilient means for biasing the movable member to a given position with respect to the stationary member, and means operated by said device for overcoming the resilient means to move the movable member with respect to the stationary member but allowing the resilient means to return the movable member to the given position additionally to position said device differently with respect to the value of the condition to be controlled, said last mentioned means including an hydraulic dash-pot arrangement.

10. In combination, a device to be positioned in a plurality of positions for controlling the value of a condition, control impedance means adjusted in accordance with changes in the value of the condition to be controlled, relay means in control of the operation of said device, balancing impedance means adjusted by said device, connections between said control impedance means, said balancing impedance means and said relay means whereby the device is positioned in accordance with changes in the value of the condition to be controlled, said balancing impedance means including a relatively stationary member and a movable member, resilient means for biasing the movable member to a given position with respect to the stationary member, a connection between the movable member and the device whereby the former is moved by the latter, and means included in said connection for allowing the resilient means to return the movable member to the given position with respect to the stationary member additionally to position the device with respect to the adjustment of the control impedance means.

11. In combination, a device to be positioned in a plurality of positions for controlling the value of a condition, control impedance means adjusted in accordance with changes in the value of the condition to be controlled, relay means in control of the operation of said device, balancing impedance means adjusted by said device, connections between said control impedance means, said balancing impedance means and said relay means whereby the device is positioned in accordance with changes in the value of the condition to be controlled, said balancing impedance means including a relatively stationary member and a movable member, resilient means for biasing the movable member to a given position with respect to the stationary member, a connection between the movable member and the device whereby the former is moved by the latter, means included in said connection for allowing the resilient means to return the movable member to the given position with respect to the stationary member additionally to position the device with respect to the adjustment of the control impedance means, and means for adjusting the rate at which the resilient means moves the movable member to the given position.

12. In combination, a device to be positioned in a plurality of positions for controlling the value of a condition, control impedance means adjusted in accordance with changes in the value of the condition to be controlled, balancing impedance means adjusted by said device, means controlled by the adjustments of the control impedance means and the balancing impedance means for positioning said device in accordance with changes in the value of the condition to be controlled, said balancing impedance means including a stationary member and a movable member, resilient means for biasing the movable member to a given position with respect to the stationary member, and means operated by the device for overcoming the resilient means to move the movable member with respect to the stationary member but allowing the resilient means to return the movable member to the given position additionally to position said device for returning the value of the condition to be controlled toward the desired normal value.

ALBERT E. BAAK.